United States Patent

Delmas

[15] 3,698,808

[45] Oct. 17, 1972

[54] OPTICAL MASKING DEVICE

[72] Inventor: Jean R. Delmas, Vanves, France

[73] Assignees: Agence Nationale De Valorisation De La Recherche (A.N.V.A.R.), Courbevoie; Centre Nationale D'Etudes Des Telecommunications (C.N.E.T.), Issey Les Moulineaux, France

[22] Filed: March 1, 1971

[21] Appl. No.: 122,630

[30] Foreign Application Priority Data

March 6, 1970 France......................7008153

[52] U.S. Cl........................................355/45, 355/55

[51] Int. Cl............................................G03b 13/26

[58] Field of Search..........355/18, 45, 54, 55, 60, 77, 355/85

[56] References Cited

UNITED STATES PATENTS

| | | | |
|---|---|---|---|
| 3,549,254 | 12/1970 | Muir | 355/55 |
| 2,493,558 | 1/1950 | Thompson | 355/45 |
| 3,280,715 | 10/1966 | Corl | 355/85 |
| 3,442,587 | 5/1969 | Croucher | 355/54 |

*Primary Examiner*—John M. Horan
*Attorney*—Abraham A. Saffitz

[57] ABSTRACT

The device is intended for optically masking a photosensitive layer on a wafer by means of a mask. It comprises a first and a second lens each having a large numerical aperture and separated by a gap. A mask holder is located in the focal plane of the first lens located on its side opposite that of the gap, and a wafer holder in the focal plane of the second lens located on its side opposite that of the gap. A source of ultraviolet radiation produces a beam aligned with the first lens axis and a source of visible light produces a beam rectangular to said axis. A semireflecting plane member located in the gap provided between the two lenses and at 45° on the axis of the first lens transmits one of the beams and reflects the other beam along the second lens axis. A first possible arrangement is such that the semireflecting member is in a space where both beams are made of parallel rays. In another possible arrangement, a concave mirror reflecting the light transmitted through the first lens and the semireflecting member is provided. Position adjustment means are provided for shifting the wafer holder in the plane perpendicular to the second lens axis and superimposing the image of the wafer through the first and second lenses and the mask. The adjustment is effected with the aid of the visible light source, the ultra-violet light source being used for photogravure purposes.

7 Claims, 4 Drawing Figures

INVENTOR:
Jean R. DELMAS
By Abraham A. Saffitz
ATTORNEY

INVENTOR:
Jean R. DELMAS
By Abraham A. Saffitz
ATTORNEY

INVENTOR:
Jean R. DELMAS
By Abraham A. Saffitz
ATTORNEY

Jean R. DELMAS
By Abraham A. Saffitz
ATTORNEY

OPTICAL MASKING DEVICE

This invention relates to a device for optically masking a photosensitive layer, inter alia in the manufacture of semiconductor devices.

Photogravure is increasingly used to form in a wafer of some appropriate semiconductor material, different local dope diffusions or implantations into the said wafer, different metal deposits produced by vacuum coating or in some other way and serving for connections. For instance, in one known procedure at least one wafer surface of a silicon wafer is covered by a layer of silicon oxide and then by a photosensitive resin layer, whereafter the sensitized wafer surface has placed on it a flat transparent mask formed with opaque zones defining the patterns to be photoengraved, and the wafer thus masked is given ultra-violet irradiation to polymerize or depolymerize, depending on the nature of the resin used, the unmasked zones of the photosensitive layer ; the wafer is then placed in a developing bath to bare the silicon oxide, which is inside or outside the patterning according to circumstances, so that the last-mentioned layer can subsequently be attacked chemically in the bared zones, the resin which remains after developing serving as a mask in the chemical treatment.

It is known that the contact process just described has been superseded by the very much better optical masking process in which the mask patterning instead of being in contact with the sensitive layer, is optically projected thereon through the agency of an appropriate optical system which during irradiation forms an image of the mask in the air, such image being made to coincide with the plane of the sensitive layer so as to locate the irradiation thereon in the same zones which a contact mask would uncover.

The resolving power of a system using a mask, optical apparatus and sensitive layer is usually stated as the number of lines which can be provided per millimeter and is limited by line edge blur ; the resolving power may also depend upon the photosensitive resin, the mask and the optical apparatus forming an image of the mask on the photosensitive layer. The resolving power of the resin can readily be improved to more than 1,000 lines/mm by a suitable choice of resin and by keeping the layer thin.

The resolving power of the mask, assumed for the sake of argument to be to a scale of unity, depends on the nature of the mask, which can be a photographic emulsion plate (from 10 to 15 $\mu$m) on a glass plate or a metal, usually chromium, mask produced by photogravure of a thin chromium layer which has in turn been produced by sublimation of the metal in vacuo on a glass plate polished on both surfaces. The thickness of chromium — about 1,000 A. — which can be provided in this way is such that a mask of this kind can give opaque zones whose "blackening" is comparable with the blackening given by a good photographic plate, but line edge definition — i.e., white-to-black shading — is much better. Shading can be reduced to less than 0.5 $\mu$m with a photographic plate and is virtually zero in the case of a chromium mask, and so the resolving power of a chromium mask may be as high as 2,000 lines per mm. Consequently, if a chromium mask is used, virtually the only limits on resolving power so far as the photosensitive layer is concerned are the characteristics of the optical equipment used to form the image of the mask on the layer.

The most recent advances in prior art can be considered to be the outcome of the following articles :

a. "Electronics Abroad," volume 38, no. 25, 13 December 1965, page 237 ;

b. "Electronics," 17 February 1969, pages 13 E and 14 E.

Referring by anticipation to the diagram in FIG. 1, an optical masking facility typical of the most recent prior art (reference (b) ) comprises the following main items :

A lens 1 and, disposed on the optical axis thereof at an angle of 45° thereto, a semi-reflecting transparent member, hereinafter called a separating strip 2 and a plane mirror 3 ;

A mask holder 4 disposed in vertical alignment with mirror 3 and comprising a mask M ;

A wafer holder 5 disposed in vertical alignment with strip 2 and having a wafer P with a photosensitive layer S sensitive to ultra-violet radiation only ;

A visible-radiation source 6 for illuminating via an optical system the layer S normal thereto through the strip 2 ;

An ultra-violet radiation source 7 for irradiating via an optical system the mask M normal thereto and then, via mirror 3 and strip 2, the layer S.

A device of this kind can be used as follows :

First, the layer S is illuminated with visible light from source 6, and the position of the wafer P in relation to the optical axis is adjusted so that the image of the layer S passing through the lens 1 is formed in the plane of the mask M so that the planes of mask M and of the layer S are conjugated with respect of the lens 1 ; the position of the wafer P is also adjusted in its plane — a positioning operation often called "alignment" — so that the layer S is centered and oriented correctly in respect of the mask M. These adjustments can be made by means of a binocular microscope having two lenses with variable spacing so that the image of the layer S can be observed in the plane of the mask M. This first stage is very important when there are a large number of different patterns to be irradiated consecutively.

Second, the layer S is irradiated with ultra-violet light from the source 7 via the mask M, mirror 3, lens 1 and strip 2.

However good the quality of the lens may be with regard to the correction of spherical aberrations, the resolving power of the prior art facility just described is limited by the following factors :

The physical aberration formed by lens diffraction (relatively large diameter of the central diffraction spot caused by the lens) causes blurring of the optical image because of excessive distances which separate the front surfaces of the lens, on the one hand, from the surface S and, on the other hand, from the mask M. In the special case often required of minus one magnification, these distances are equal and the fact that they are excessive is the result of having to interpose the separating strip 2 between the lens 1 and the surface of the layer S.

The permanent presence of the mirror 3, which, like the strip 2, is disposed in a gap where the light is in the form of a non-parallel beam, also causes various aberrations including astigmatism, which impair the optical image provided by the lens.

The resolving power which a system of this kind can provide is 300 lines per mm in the edge zone and 400 lines in the central zone, in a field of the order of 50 mm in diameter.

Starting from an apparatus for optically masking a photosensitive layer on a wafer by means of a mask and a lens with a semi-reflecting separating transparent strip enabling in a first stage the sensitive layer to be positioned relatively to the mask in visible light and in a second stage enabling the sensitive layer to be irradiated with ultra-violet light, it is a main object of this invention to appreciably improve the resolving power.

Consequently, according to a main feature of the optical masking apparatus provided by the invention, all optical elements are removed from the object and image spaces of the lens, the sensitive layer and the mask are brought very near the associated front surfaces of the lens ; and the separating strip is disposed in an intermediate space in which the light is transmitted through the lens from the mask to the sensitive layer or vice versa is. This feature greatly reduces lens diffraction aberrations and the geometric aberrations caused by the accessory optical elements.

The masking device according to the invention and of use for the practice of the method just defined is characterized in that the lens system is divided into two lens elements each having a large numerical aperture and separated by a gap of sufficient axial length to receive the separating strip adapted to receive laterally the light from the visible-light source. In a first form of embodiment of the invention, the mask and the sensitive layer are each placed at one of the focal points of the lens system and very near the lens front surfaces, so that diffraction aberrations are reduced very considerably and the light passing through the lens system in both directions is in the form of a parallel beam.

In a particularly simple form of the latter embodiment, the mask being to the scale of unity, lens magnification is equal to minus one, the two lens elements then being identical ; advantage is taken of the improved resolving power of the system to work with a magnification of unity, with the usual advantage that the mask can be life-size as in the contact process.

The lens element near the mask is stationary, and the lens element near the wafer is focusable. The advantage of this feature is that there is no need to adjust the axial position of the mask, which is not touched in series production, nor of the wafer, which may need occasional readjustment of focussing if only because of the introduction of dust between the sensitive surface and its securing plane ; this readjustment of focussing can be carried out to an accuracy of 1 micron.

Another advantage of the same arrangement is that separating strip may be retractable, so that it can be removed after the optical alignments have been made and before the irradiation operation occurs. This can be done without impairing optical adjustment since the separating strip is disposed in a gap where the light is in the form of a parallel beam.

In a second form of embodiment of the invention, the axes of the two lens elements are perpendicular to each other, and light is transmitted from one to the other of the said elements through optical means including the separating strip followed by a concave mirror having a common axis with the lens element located near the mask, the arrangement being such that the concave mirror substantially "works on its curvature center," i.e. that the rays received from the point of the mask located on the said common axis are reflected towards the said curvature center. When the so reflected rays reach the separating strip, they are reflected in the direction of the axis of the lens element located near the wafer and through the latter element towards this wafer. The main advantage of the just-described arrangement resides in its greater luminosity and in the possibility of using lens elements much simpler and less expensive than in the case of the first above-described arrangement. In both said embodiments, the device may comprise means having a pneumatic diaphragm for the immediate engagement of the wafer sensitive layer on axial location abutments. In series production, of course, this feature helps to appreciably increase the rate at which wafers can be irradiated.

The invention will be more clearly understood from the following description of two embodiments of a device according to the invention, reference being made to the accompanying drawings wherein.

Figure 1:
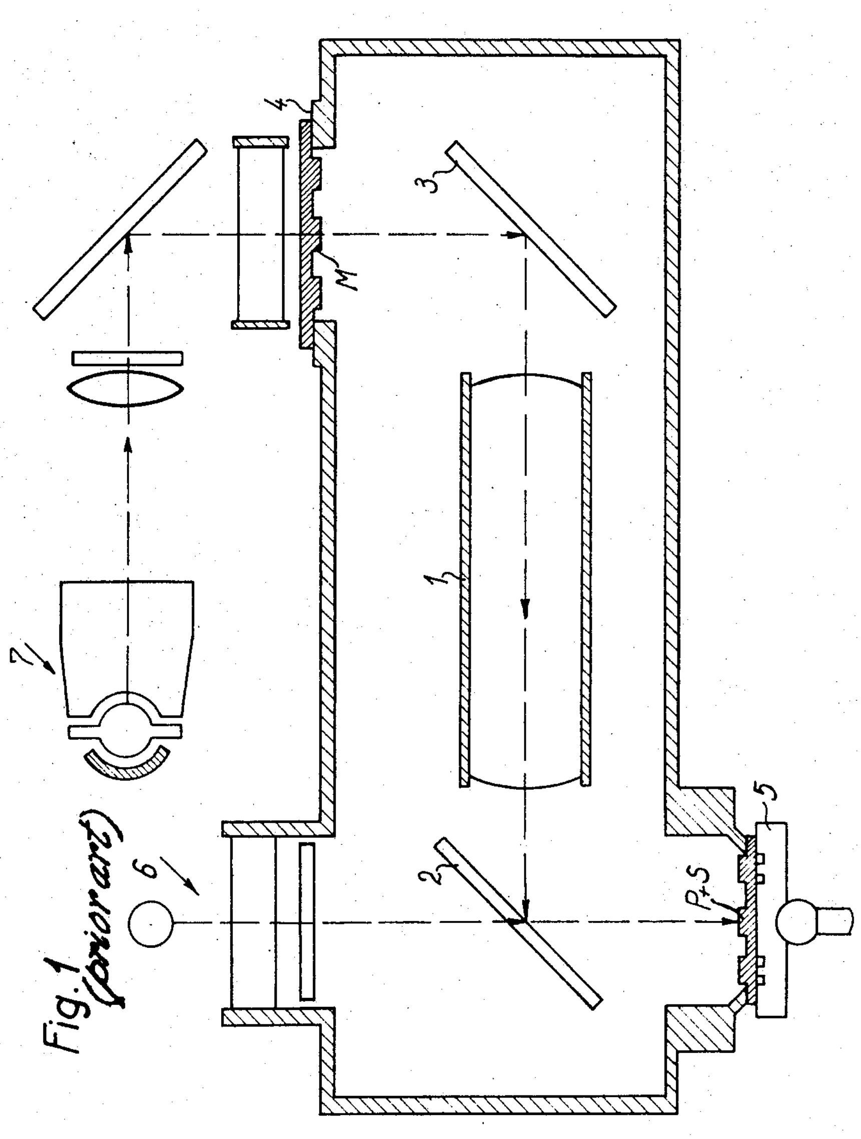
Fig. 1 (prior art)
FIG. 1 is a view in vertical axial section of a prior art optical device which has been disclosed in the introductory part.
Figure 2:
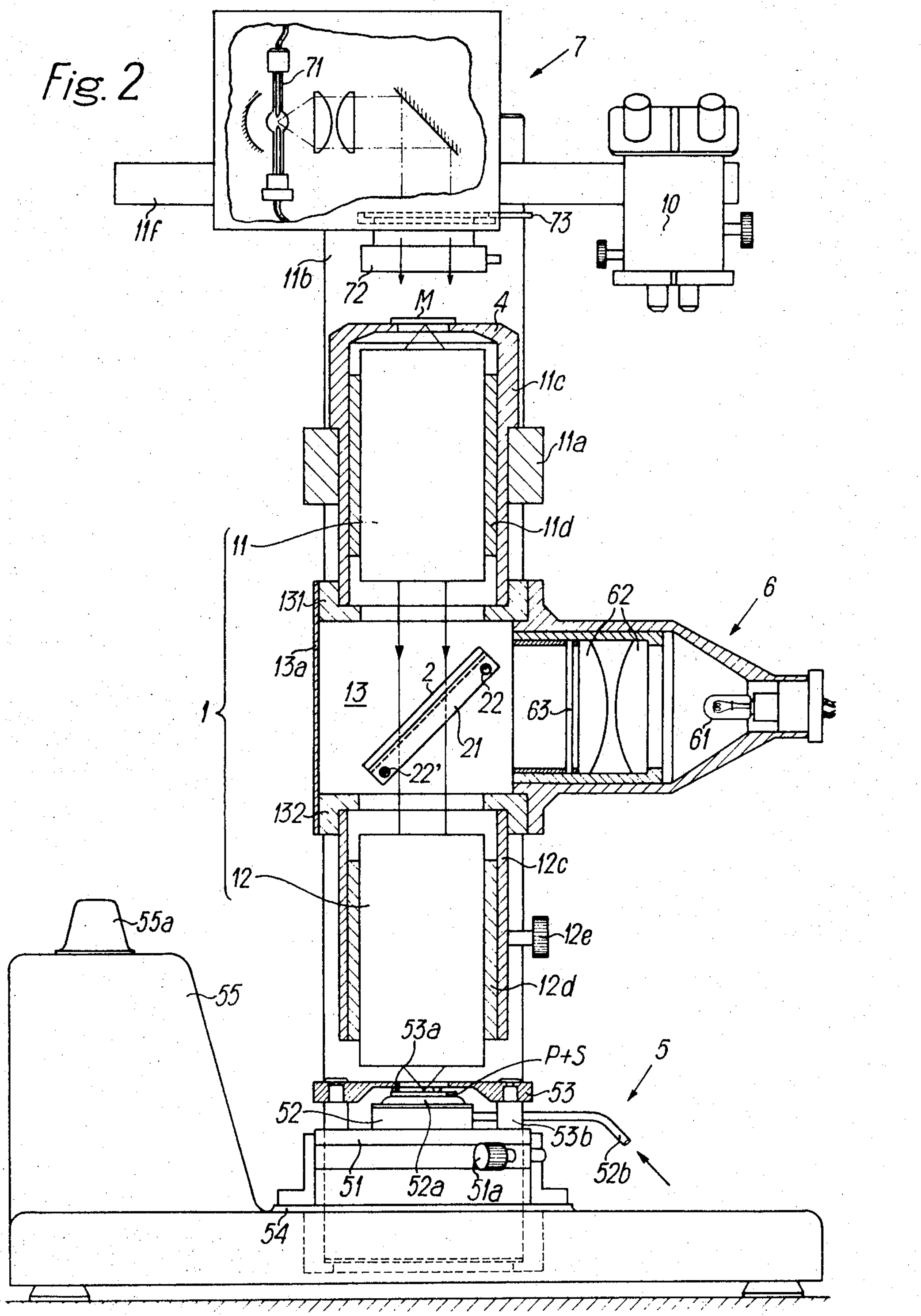
FIG. 2 is a view in vertical axial section of an optical masking device according to the first above-said form of embodiment of the invention equipped with a checking microscope.

As shown in FIG. 2, an optical masking device according to the invention comprises, like the known device of FIG. 1, a lens 1 and a separating strip 2 disposed at an angle of 45° to the optical axis of the lens, a mask holder 4 comprising a mask M, a wafer holder 5 comprising a wafer P with an ultra-violet sensitive layer S, a visible-light source 6 for illuminating the layer S by reflection on the strip 2, and an ultra-violet source 7 for irradiating the mask M and then, through the lens 1, the layer S.

The device according to the invention as shown in FIG. 2 has as well the following features :

The lens 1 is divided into two elements 11, 12 which are on the same vertical optical axis and which are spaced apart from one another because of the presence of an intermediate box 13 pierced with the appropriate apertures. It will be assumed in this case, although it is not essential, that the magnification provided by the lens 1 is minus one, and so the two elements 11, 12 are identical. The top element 11 is mounted in a bracket *11a* which forms part of a vertical column *11b* and which has a cylindrical shoulder bearing a bush *11c* in which a mount *11d* for the element 11 is fixedly secured. Bush *11c* is pierced at the top with a coaxial aperture serving as mask holder 4, so that mask M is disposed at the upper focal point of element 11.

The parallelepipedic intermediate box 13 has a top cylindrical shoulder 131 and a bottom cylindrical shoulder 132 ; the shoulders 131, 132 secure the bush *11c* and a similar bush *12c* for the lens element 12. The tubular bush *12c*, which is completely open at the bottom, receives a mount **12*d* for bottom lens element 12, which can slide with reduced friction in bush 12*c*. Accordingly, mount 12*d* has disposed along a generatrix a rack (not shown) cooperating with a demultiplied pinion (not shown) operated by a knurled knob or button or the like 12*e* to give positioning of lens element 12 along its optical axis to an accuracy of 1 micron. Box 13 also has a laterally open shoulder receiving and securing the visible-light source 6 comprising e.g. an incandescent tungsten-filament bulb 61, a condenser 62 and an optical filter 63** whose pass band is, for example, in the yellow range.

That side wall of box 13 which is opposite the side wall just referred to is formed with a wide aperture which is normally closed by a door **13*a* and through which the semi-reflecting transparent strip 2 can be introduced into box 13 to be positioned at an angle of 45° to the optical axes of the lens 1 and source 6, on a strip holder 21. The chamber embodied by the box 13 comprises a ledge which is at the front of the plane of FIG. 2 and which is dimensioned to receive the strip holder 21. The same is mounted on two rods 22, 22' which are shown in section in FIG. 2 and which are kept horizontal by two slideways (not visible in FIG. 2) secured to the walls of the box ledge, the two rods 22, 22' being interconnected outside the ledge by a handle 23 which can be seen in FIG. 3. The strip 2 can therefore be withdrawn from the center of box 13** as required.

The wafer holder 5 is embodied as follows:

A pneumatic capsule 52 on top of which is a diaphragm **52*a* and which is supplied with compressed air through a tube 52*b* is disposed on a base 51 which can be turned by means of a tangent screw operated by a knurled knob of button 51*a*. The wafer P with its sensitive layer S is placed on the deflated diaphragm 52*a*. When the same has been stretched by the air pressure, the wafer P is engaged with three plane abutments 53*a* which are secured to the back of a plate 53; the same is formed with a central aperture and is rigidly secured by two pillars or the like 53*b* to the base 51. Base 51 is borne by a plate 54 and can be moved in its horizontal plane by a knob or button 55*a* acting on a known conventional micromanipulator 55. Lens element 12 is assumed to be adjusted so that the horizontal plane defined by the abutments 53*a* is at the focal point of element 12**.

Figure 3:
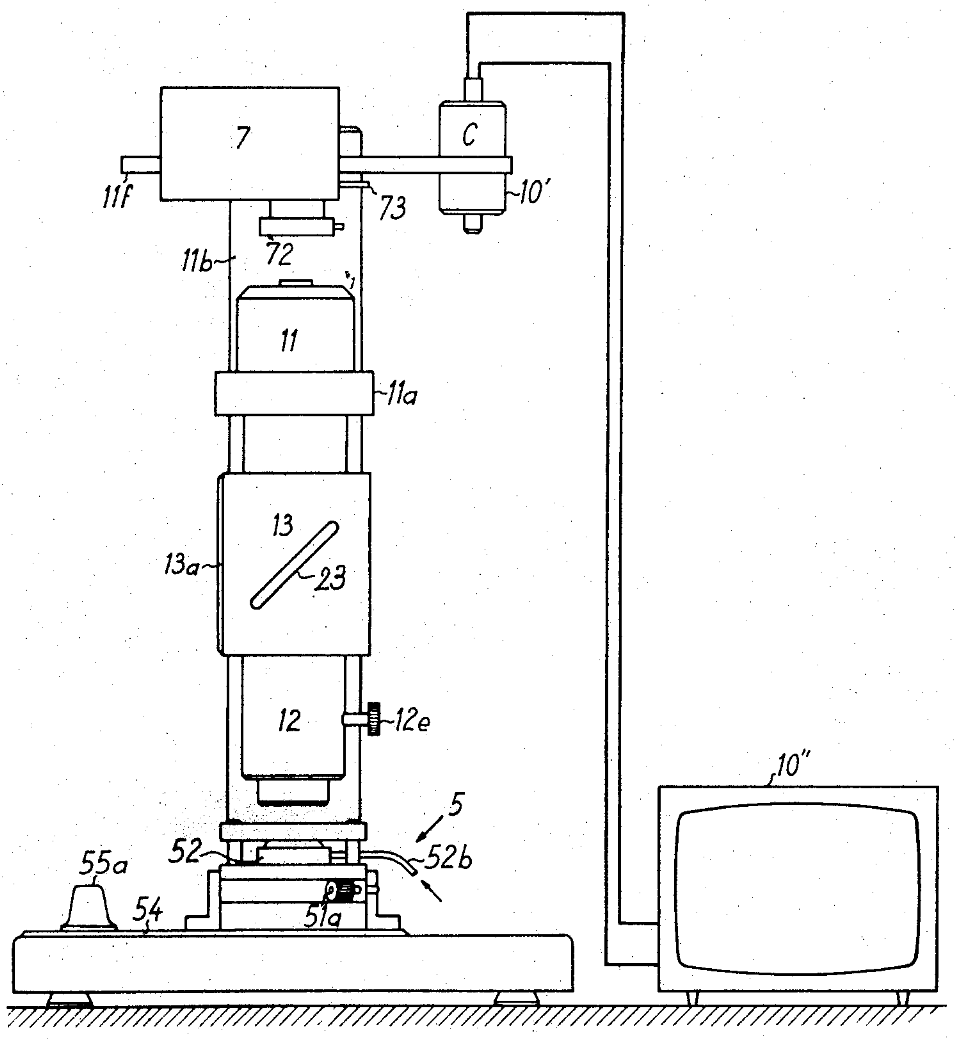
FIG. 3 is a front view of the optical masking device of FIG. 2 equipped with a television camera and receiver.

A horizontal rod **11*f* disposed above the mask holder, is rigidly connected to column 11*b* and has slidingly mounted on it, a binocular self-illuminating checking microscope 10 having two variable-spacing lenses which can, for instance, be moved in a plane parallel to the plane of the mask M for exploration of the entire operative surface of the mask (FIG. 2), or as shown in FIG. 3 a television camera 10' which, in association with an appropriate lens, can provide an enlarged image of the plane M on the screen of a television receiver 10'' disposed on the table for the complete device, to facilitate the operator's work (FIG. 3**).

An ultra-violet radiation source 7 is secured to horizontal rod **11*f*; it comprises a known mercury-vapor bulb 71, an iris shutter 72, and an optical filter 73 passing the ray of the mercury spectrum corresponding to the wavelength of 4,356 A., for which the lens 11–12** is designed and which falls in the spectral sensitivity range of the particular photosensitive resin used.

First, assuming that the mask M is in position and that compressed air is engaging the wafer P with its sensitive layer S with the three abutments **53*a* and that the bulb 61 is on, the image of the layer S formed in the plane of the mask M is observed through the microscope 10. The knobs 51*a* and 55*a* are operated to center and orient the wafer P, and therefore the layer S, relatively to the mask M. If need be, should the position of the layer S on the lens optical axis go out of adjustment, even if only because of dust, the knob 12*e*** is operated to focus the image of the layer S correctly in the plane of the mask M.

In a second stage the strip 2 is retracted, the microscope 10 is replaced by the source 7, and the shutter 72 is briefly opened to irradiate the layer S through the mask M.

A device according to the invention makes it possible to use a lens having a very large numerical aperture to achieve e.g. a resolving power of something like 1,000 lines per mm in a field of approximately 50 mm diameter with a high modulation level (in the relationship giving the light intensity versus the coordinates of the current point of the layer, the modulation level is the ratio "valley intensity" to "peak intensity" for two adjacent image positions), the lens being corrected for the visible wavelength of layer-mask alignment and for the irradiation wavelength of the photosensitive layer.

In more general terms, since the separating strip is, in accordance with the invention, unable to disturb the lens image, the lens required for a given resolving power need not have a higher theoretical resolving power. The invention therefore makes it possible to use a lower-grade and therefore cheaper lens than in the prior art for a given real resolving power.

Geometrical changes can be made in the construction of the optical masking device of the invention. A first change could consist in interchanging the position of the visible light source 6 with the position of the ultraviolet source, lens 11 and mask M, thus forming a 90° bent optical system instead of an aligned one. In this case, the semireflecting strip must lie permanently in its place both in the optical alignment step and in the irradiation step. The advantage of the proposed change is to lower the apparatus height.

In the above-mentioned second form of embodiment of the invention, (FIG. 4), the parts 12, P and 5 are at right angles with respect to FIG. 2, that is in alignment with the visible light beam and an additional concave mirror 3 is placed in alignment with lens 11 in order to reflect back the light from lens 11 which has been transmitted through strip 2 and to have the same directed to lens 12 after reflection on strip 2. The advantage of this embodiment is that the radius of mirror 3 can be selected in order to have the assembly 11, 2, 3, 12 corrected of aberrations as well as in the case of FIG. 2 but without needing that lenses 11 and 12 be constructed as multi-element lenses. Therefore for a given image quality, the lenses are thinner in the apparatus of FIG. 4 than in the apparatus of FIG. 2 and the light losses due to absorption in the glass are lower which increases the image contrast.

Figure 4:
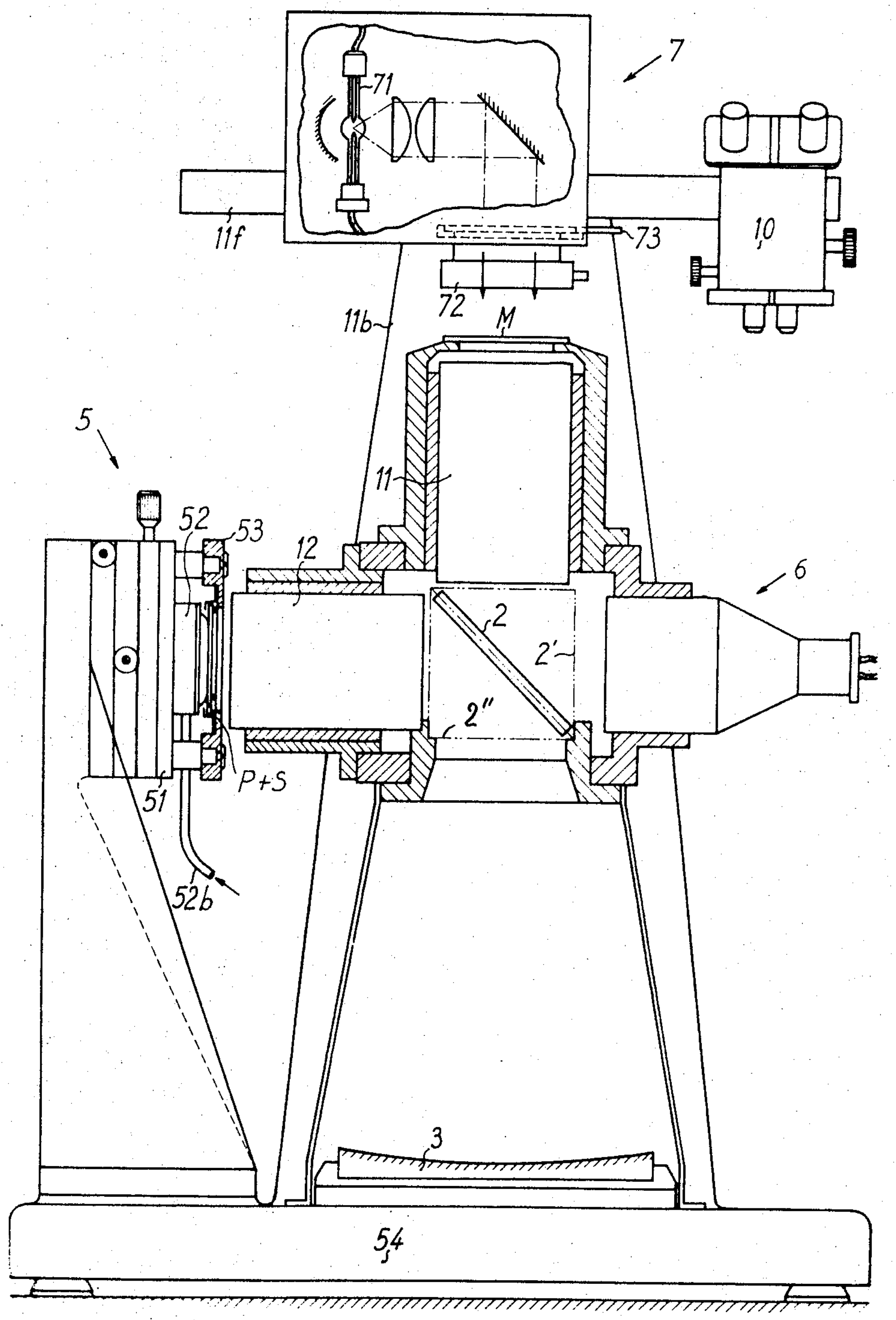
FIG. 4 represents the above-said second form of the embodiment of the optical masking device of the invention.

Strip 2 in the apparatus of FIG. 2 as well as in the apparatus of FIG. 4 can be replaced by a so-called Lummer's cube, that is two prisms 2', 2'' having in cross-section the shape of a rectangular isosceles triangle (shown in dotted line in FIG. 4) and placed side by side with each other.

What I claim is:

1. A device for optically masking an ultra-violet light photosensitive layer on a wafer by means of a mask, said device comprising in the following order a first lens, a gap and a second lens, both lenses having a large numerical aperture, a mask holder in the focal plane of the first lens located on its side farther from said gap, a wafer holder in the focal plane of the second lens located on its side farther from said gap, a source of ultra violet radiation and a source of visible light alternatively and at will producing rectangular visible and ultraviolet beams, the ultraviolet beam being aligned with the first lens axis, a semi-reflecting plane member located in said gap and oriented at 45° relatively to the axes of said lenses, said member transmitting one of said beams and reflecting the other of said beams in a common direction along said second lens axis, means for adjusting the position of said second lens along its axis so as to focus the image of said mask upon said wafer and means for shifting said wafer holder in the plane perpendicular to the second lens axis and superimposing the image of the wafer seen through said first and second lens on said mask, whereby an ultraviolet masking pattern which is the image of the mask through the lenses is formed on the photosensitive layer.

2. A device for optically masking a photosensitive layer as set forth in claim 1 in which the mask is to the same scale as the ultraviolet masking pattern, the two lenses are identical and the magnification of the objective formed by said two lenses is minus one.

3. A device for optically masking a photosensitive layer as set forth in claim 1, in which the first and second lenses are coaxial.

4. A device for optically masking a photosensitive layer as set forth in claim 1 in which the wafer holder comprises at least three point abutments and a pneumatic diaphragm for supporting the wafer and engaging the same against said abutments.

5. A device for optically masking a photosensitive layer as set forth in claim 1 comprising means for retracting the semireflecting member from the beam paths.

6. A device for optically masking an ultra-violet light photosensitive layer on a wafer by means of a mask, said device comprising in the following order a first lens, a gap and a second lens, both lenses having a large numerical aperture and having mutually perpendicular axes, a mask holder in the focal plane of said first lens, a wafer holder in the focal plane of said second lens located on its side farther from said gap, a source of ultraviolet radiation producing an ultraviolet radiation beam aligned with said first lens axis, a source of visible light producing a visible light beam aligned with said second lens axis, said sources operating alternatively at will, a semireflecting plane member located in said gap near the junction point of said lens axes and inclined at 45° with respect to said axes, said member transmitting one of said beams and reflecting the other of said beams in a common direction along said second lens axis, means for adjusting the position of said second lens along its axis so as focus the image of said mask upon said wafer, means for shifting said wafer holder in the plane perpendicular to said second lens axis and superimposing in visible light the image of the wafer through said first and second lenses and the mask, whereby an ultraviolet masking pattern which is the image of the mask through the lenses is formed on said photosensitive layer, and a concave mirror located on the first lens axis for reflecting towards said semireflecting member the part of said ultraviolet light beam which is transmitted through said member without reflection, said mirror having its axis substantially coinciding with said first lens axis.

7. A device for optically masking a photosensitive layer as set forth in claim 6, in which said semireflecting member consists of a Lummer's cube made of two prisms having in cross-section the shape of a rectangular isosceles triangle and placed side by side with each other.

* * * * *